United States Patent
Rafac

(10) Patent No.: US 7,256,893 B2
(45) Date of Patent: *Aug. 14, 2007

(54) METHOD AND APPARATUS FOR MEASURING BANDWIDTH OF AN OPTICAL SPECTRUM OUTPUT OF A VERY SMALL WAVELENGTH VERY NARROW BANDWIDTH HIGH POWER LASER

(75) Inventor: Robert Rafac, Carlsbad, CA (US)

(73) Assignee: Cymer, Inc., San Diego, CA (US)

( * ) Notice: Subject to any disclaimer, the term of this patent is extended or adjusted under 35 U.S.C. 154(b) by 411 days.

This patent is subject to a terminal disclaimer.

(21) Appl. No.: 10/609,223

(22) Filed: Jun. 26, 2003

(65) Prior Publication Data

US 2004/0263844 A1 Dec. 30, 2004

(51) Int. Cl.
*G01B 9/02* (2006.01)
(52) U.S. Cl. .................. 356/454; 356/519; 356/451
(58) Field of Classification Search ............. 356/454, 356/480, 519, 451; 250/252.1, 227.23
See application file for complete search history.

(56) References Cited

U.S. PATENT DOCUMENTS

| | | | | |
|---|---|---|---|---|
| 6,317,448 B1 * | 11/2001 | Das et al. | ...... | 372/60 |
| 6,952,267 B2 * | 10/2005 | Rarac | ...... | 356/454 |

* cited by examiner

*Primary Examiner*—Hwa (Andrew) Lee
(74) *Attorney, Agent, or Firm*—William C. Cray

(57) ABSTRACT

An apparatus and method for controlling a laser system is disclosed which may comprise a spectrometer adapted to measure an unknown bandwidth of a spectrum of light emitted from the laser, which may comprise an optical bandwidth measuring unit adapted to provide as an output a measured parameter, which is indicative of a parameter of the unknown bandwidth of the spectrum being measured; a reported parameter computing unit adapted to compute a reported parameter of the unknown bandwidth of the spectrum being measured according to the formula: Reported Parameter("RP")=A*(Measured Parameter("MP"))+C, wherein the RP and MP are a different type of parameter and the values of A and C are determined based upon calibration of the optical bandwidth measuring unit MP response for light of known valued of RP.

72 Claims, 1 Drawing Sheet

METHOD AND APPARATUS FOR MEASURING BANDWIDTH OF AN OPTICAL SPECTRUM OUTPUT OF A VERY SMALL WAVELENGTH VERY NARROW BANDWIDTH HIGH POWER LASER

FIELD OF THE INVENTION

The present invention relates to the accurate estimation of bandwidth of a source, e.g., the bandwidth of a laser emitted light for lasers emitting light at narrow bandwidths.

BACKGROUND OF THE INVENTION

Spectrometers are well known for use in the measurement of both wavelength and bandwidth of light sources, e.g., lasers. The output of such a bandwidth meter for example is actually the result of measurement, e.g., utilizing a position sensitive detector, e.g., a photo diode array ("PDA") as is well known in the art. The bandwidth meter has its own response function that modifies the spectrum being measured during the measurement of the bandwidth.

However, as the requirements for more narrow critical dimension line features on, e.g. Ultra-Large-Scale-Integration ("ULSI") integrated circuit fabrication are ever increasing (decreasing critical dimensions), the demand for pure laser light at a particular short wavelength (Deep Ultraviolet—"DUV" and Extreme Ultraviolet—"EUV") and with purity defined by very narrowly controlled bandwidth around the center wavelength, the etalons used for such measurements are becoming much more susceptible to error due to the laser bandwidths required approaching the same bandpass as practical etalons in use. For, example on a recently released product of Cymer, Inc., the owner by assignment of the present application, the XLA 100, an on-board bandwidth meter utilized an etalon with a bandpass of about 0.12 pm and the laser provided an output generally between about 0.1 pm and 0.18 pm, discounting bandwidth resonance. The convolution then distorts the measured laser light, e.g., in bandwidth, in ways that now make or will soon make measurements of, e.g., the full width half maximum ("FWHM") insufficiently accurate for properly monitoring laser output.

Currently the output of the bandwidth meter used as an indication of the bandwidth of the measured laser light bandwidth is, e.g., a measure of a fringe width, e.g., at full width half maximum ("FWHM") of a fringe produced by the etalon optics less some constant error value sometimes called Etalon Resolution ("ER") or Etalon Correction ("EC"). This has been done, e.g., in lasers sold by the assignee of the present invention under the names of NL-7000 and ELS, employing EIS wave meters, utilizing a slope and intercept formulation of Spectrum FWHM A(fringe FWHM)+C, with A and C calculated in a calibration process, e.g., at the time of manufacture.

There is a need, therefore for an improved methodology.

SUMMARY OF THE INVENTION

An apparatus and method for monitoring a laser system is disclosed which may comprise a bandwidth meter, i.e., spectrometer, adapted to measure an unknown bandwidth of a spectrum of light emitted from the laser, which may comprise an optical bandwidth measuring unit adapted to provide as an output a measured parameter, which is indicative of a parameter of the unknown bandwidth of the spectrum being measured; a reported parameter computing unit adapted to compute a reported parameter of the unknown bandwidth of the spectrum being measured according to the formula: Reported Parameter ("RP")=A*(Measured Parameter ("MP"))+C, wherein the RP and MP are a different type of parameter and the values of A and C are determined based upon calibration of the optical bandwidth measuring unit MP response for light of known valued of RP. The optical bandwidth measuring unit may comprise an interferometric or dispersive optical instrument, such as an etalon or a grating spectrometer. RP may be, e.g., at FWXM and MP may be, e.g., FWX'M,wherein X≠X'. RP may be, e.g., at EX% and MP may be, e.g., at FWXM.

DETAILED DESCRIPTION OF THE PREFERRED EMBODIMENTS

Figure 1:
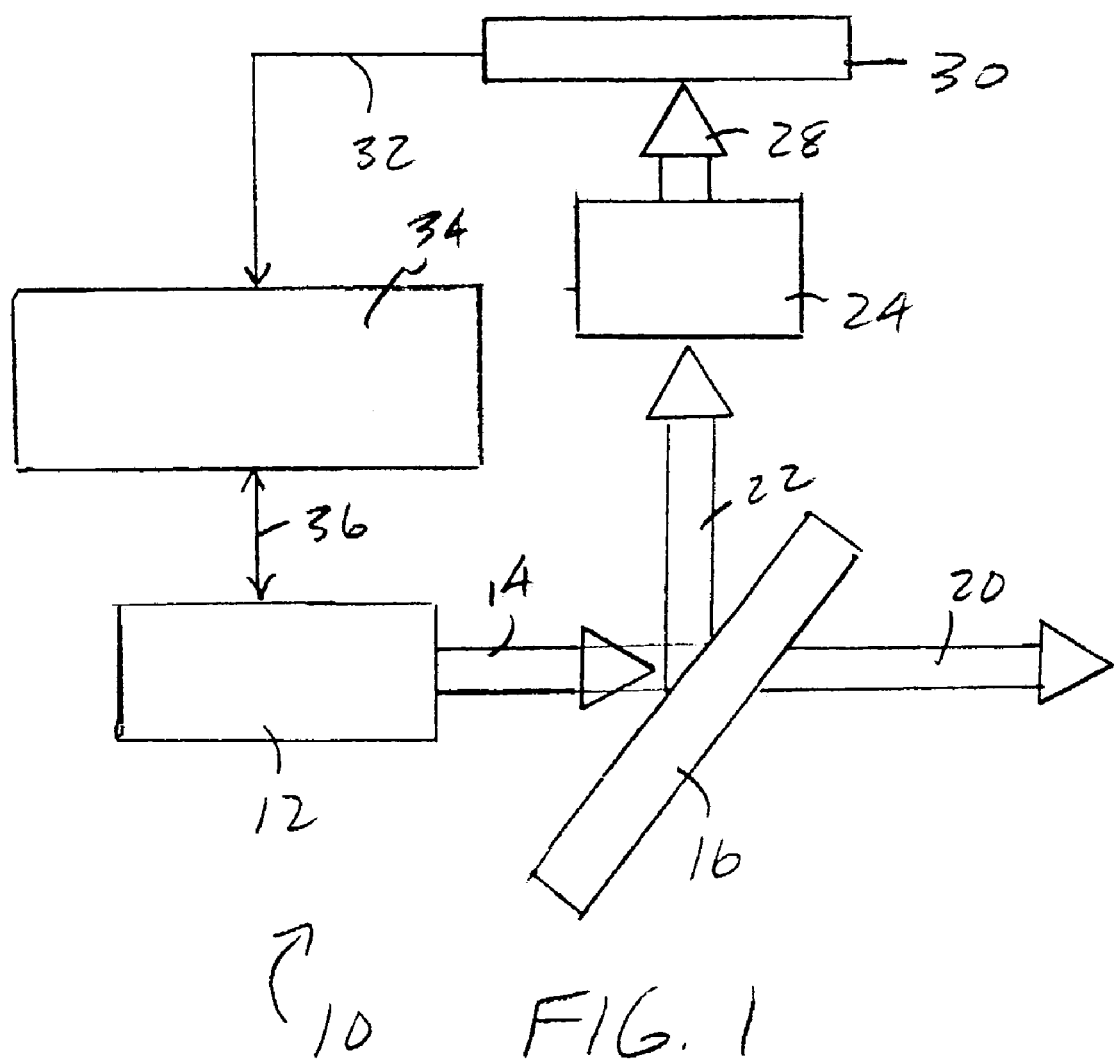
FIG. 1 shows a schematic diagram of a laser bandwidth monitoring system according to an embodiment of the present invention.

The applicant has discovered that the coefficients A and C referenced above in this approximation can vary with changes in the detailed spectral shape of the source, these changes being anticipated with operating condition or age of source.

Turning now to FIG. 1 there is shown a schematic diagram of a laser bandwidth control system 10 according to an embodiment of the present invention. The system 10 may include, e.g., a laser 12, e.g., an excimer gas discharge laser, e.g., an XLA-100 currently being sold by the assignee of the present application. The laser may emit a beam of light 14, e.g., nominally at 193.368 nm with a bandwidth of, e.g., 0.1-0.3 pm.

The beam 14 may be incident upon a beam splitter 16 which may pass, e.g. almost 99% of the light in the beam 14, forming beam 20 and reflect essentially the rest of the light in the beam as beam 22. Beam 22 may be passed through a bandwidth detector, e.g., dispersive or interferometric bandwidth detector, e.g., an etalon 24, which can create, e.g., a beam having peaks in concentric rings which are a function of the wavelengths of the light in the spectrum of the beams 20, 22, the fringes of the peaks being also a function of the bandwidth of the spectrum of the light in the beams 20, 22.

The beam 28 can be incident upon an array 30 of photodetectors, e.g., photo-diodes (a "PDA"). The photodiodes (not shown) of the PDA 30 can produce, e.g., a current, which is a measure of the intensity of the light incident upon a respective photodiode in the PDA 30. The values of the voltages may be converted to digital representations and passed on a bus 32 to a processor 34, or the analog version of the voltage for each photodiode may be passed to the processor 34 and converted in the processor 34 or in an interface (not shown) to the processor 34, into digital values, for use by a processor 34. The processor 34, among other things, may be utilized to compute a measured value for the bandwidth of the spectrum of the beams 20, 22.

The computation may take the form, e.g., of a determination from the voltage values of the presence of a peak, e.g., by comparing adjacent photodiode (also called "pixel") values serially until a value of the, e.g., current of a pixel is less than a preceding pixel current value, indicating the prior pixel was a peak, followed by utilizing the photodiode current values for pixels on either side of the peak, e.g., ±10 pixels. Utilizing any of a number of well known interpolation algorithms the processor can determine a value that is, e.g., half of the maximum voltage value and also a location along the photodiode array, at, e.g., a sub-pixel pitch, of the occurrence of that half maximum in the spectrum as sensed by the photodiodes, on each side of the maximum, and thus determine, from this separation the FWHM sensed by the PDA 30. This is sometimes referred to as the fringe measurement at, e.g., FWHM. Utilizing, e.g., this FWHM bandwidth measurement, the controller can, e.g., send a signal to an operator console (not shown), e.g., indicative of the computed estimate of bandwidth of the light in beams 20, 22, e.g., being out of specification.

The processor (not shown) in the controller 34 may compute the unknown spectral bandwidth of the spectrum of, e.g., the laser emitted light in the beams 20, 22, according to a slope and intercept formula $BW_1$ (e.g., at FWHM)=$A^*$ (fringe measurement (e.g., at FWHM))+$C$. The slope and intercept, A and C, may be, e.g., predetermined calibration values, e.g., which may be determined for a given wave meter at the time of manufacture. These values of A and C may be determined, e.g., by calibration with light sources whose FWHM is measured with a very accurate bandwidth meter. For purposes of this application the value utilized in calibration, e.g., FWHM of the spectrum of the calibration light will be referred to as the Measured Parameter. The value utilized to determine the bandwidth of the response of the bandwidth detector to the spectrum of light being measured by the bandwidth detector/meter will be referred to as the reported parameter. The Reported Parameter is, therefore, the computed value from the measured voltages from the PDA 30 used ultimately to determine if the light is of the right bandwidth and to provide control instruction to the laser if the laser is not within operating specifications.

According to an embodiment of the present invention applicants have discovered that improved performance of the bandwidth detector described above may be achieved where the calibration values are determined for a Measured Parameter ("MP") that is other than the Reported Parameter ("RP"). For example, if the user of the laser 12 is looking for an RP of FWHM then the system 10 could be calibrated at something else, e.g., FWXM, where X is other than 50% (half max), e.g., FW75% M, and the calibration of the bandwidth detector at manufacture done at this other value FWXM, e.g., FW75% M. This may have the beneficial effect that FW75% M may be less sensitive to other variations in the bandwidth meter response due, e.g., to changes over life or changes in operating environment, or may be less sensitive to changes in other parameters of he spectrum of the laser life as the laser life grows, e.g., EX %, e.g., E95% ("E95"). That is to say, a measurement of the purity of the spectrum, i.e., narrow bandwidth, from the width of the portion of the spectrum on either side of the peak of the spectrum containing some percentage of the total energy (or at least some reasonable approximation of the total energy, e.g., ±10 pm on either side of the peak) of the spectrum. This could be E95%, or E95.5%, or E93% as examples. That is, 95%, 95.5% or 93%, respectively, as examples of the energy in the spectrum existing at, e.g., ±10 pm on either side of the peak.

In operation according to this embodiment of the present invention, the processor in the controller 34 may be programmed to utilize the same interpolation algorithm to compute FW75% M, i.e., the number of, e.g., ¼ pixels between the interpolated values equaling 75% of the max at the peak of the spectrum on either side of the max, as indicated by the currents of the photodiodes in the PDA 30. This value may then be reported to the user as the, e.g., FWHM for the actual beam as measured by the system 10.

Similarly, the Reported Parameter ("RP") could be EX, e.g., E95% and the Measured Parameter ("MP") could be FWXM, e.g., FWHM. In operation then the calibration at the factory on manufacture would compare the response of the bandwidth detector at FWXM, e.g., FWHM to light spectra with highly accurately measurements of E95 to determine the values of A and C, and the processor 34 will output the Reported Parameter based upon the formula:

$$RP(E95\%)=A^*(\text{fringe measurement}(FWXM))+C$$

In like manner, the calibration could be at FW75% M and the response at FW75% M of the bandwidth detector measured against light of known FWHM bandwidths and the processor in the controller 34 used to report out the Reported Parameter according to the formula:

$$RP(FWHM)=A^*(\text{fringe measurement}(FW75\% \text{ M}))+C$$

In another embodiment of the present invention, the formula may be:

$$RP(E95)=A^*(\text{fringe measurement}(FW25\% \text{ M}))+C$$

Applicant has discovered that utilizing, e.g., FW75% M measured in the bandwidth detector with slope and intercept calibrations also made at FW75% M currently used bandwidth detectors, e.g., within a spectral analysis module ("SAM") on, e.g., an XLA-100 made by the assignee of the present application, a reduction in sensitivity to, e.g., spectral E955 bleed-through is possible by up to about 50%, without change in resolution, i.e., relative to pixel scale. It is believed that the effect will be to reduce, e.g., FWHM tracking error by about a factor of two, e.g., for resonance-induced bandwidth excursions, e.g., significantly reducing the probability of reporting out bandwidth that are our of specification when the laser light is in fact within specifications for bandwidth, and other problems. In the particular embodiment of FWHM as the Reported Parameter and FW75% M as the Measured Parameter utilizing FW75% M on the output of, e.g., the photodiodes in the PDA 30 may, e.g., yield a Reported Parameter that is less sensitive to energy in the spectral wings of the spectrum being measured than if FWHM were actually used on the output of the photodiodes of the PDA 30. Depending, e.g., on specific spectral shapes, other bandwidth metrics may be utilized in the measurements based on the outputs of, e.g., the PDA photodiodes, and also in the calibration process, the object being to yield the best performance (accuracy of reported estimate of bandwidth) over the widest bandwidth range and anticipated variation in the detailed spectral shape.

Those skilled in the art will understand that an important aspect of an embodiment of the present invention is that the bandwidth metrics utilized on the two sides of the slope and intercept equation need not be the same type. a better approximation of the actual bandwidth being measured is often capable using this technique where the metric for the reported parameter (the metric desired for reporting the bandwidth of the spectrum having the unknown bandwidth) is different from the measured parameter actually measured in the detector (i.e., as done by the processor based upon the output voltages from the photodiodes of, e.g., the PDA 30), e.g., RP in E95 and MP in FWHM or RP in FWHM and MP in FW75% M, provided that the calibration is also done in the respective MP value and the details of the shape of the possible unknown spectra are defined and reasonably systematically or physically constrained so that the proper selection of RP v. MP can be determined and utilized.

The above described embodiments of the present invention are intended only for explanation and illustration purposes and are not the only embodiments in which the present invention may reside. Those skilled in the art will understand that many modifications and changes may be made to the described embodiments without changing the intent and spirit of the present invention. For example, other bandwidth detection apparatus besides etalons may be utilized to provide the measured parameters for computing the reported parameter. The scope of the present invention, therefore, should be considered in light only of the appended claims and legal equivalents.

I claim:

1. A laser monitoring system, comprising:
   a spectrometer measuring an unknown bandwidth of a spectrum of light emitted from the laser, comprising:
   an optical bandwidth measuring unit providing as an output a measured parameter, which is indicative of a parameter of the unknown bandwidth of the spectrum being measured;
   a reported parameter computing unit computing a reported parameter of the unknown bandwidth of the spectrum being measured according to the formula:

Reported Parameter("RP")=$A$*(Measured Parameter ("MP"))+$C$, wherein the RP and MP are a different type of parameter and the values of A and C are determined based upon calibration of the optical bandwidth measuring unit MP response for light of known valued of RP.

2. The apparatus of claim 1 further comprising:
   the optical bandwidth measuring unit comprises an interferometric or dispersive optical instrument.
3. The apparatus of claim 1 further comprising:
   the optical bandwidth measuring unit comprises an etalon.
4. The apparatus of claim 2 further comprising:
   the optical bandwidth measuring unit comprises an etalon.
5. The apparatus of claim 1 further comprising:
   RP is at FWXM and MP is at FWX'M, wherein X≠X'.
6. The apparatus of claim 2 further comprising:
   RP is at FWXM and MP is at FWX'M, wherein X≠X'.
7. The apparatus of claim 3 Further comprising:
   RP is at FWXM and MP is at FWX'M, wherein X≠X'.
8. The apparatus of claim 4 further comprising:
   RP is at FWXM and MP is at FWX'M, wherein X≠X'.
9. The apparatus of claim 1 further comprising:
   RP is at EX % and MP is at FWXM.
10. The apparatus of claim 2 further comprising:
    RP is at EX % and MP is at FWXM.
11. The apparatus of claim 3 further comprising:
    RP is at EX % and MP is at FWXM.
12. The apparatus of claim 4 further comprising:
    RP is at EX % and MP is at FWXM.
13. A spectrometer for measuring an unknown bandwidth of a spectrum of light, comprising:
    an optical bandwidth measuring unit providing as an output a measured parameter, which is indicative of a parameter of the unknown bandwidth of the spectrum being measured;
    a reported parameter computing unit computing a reported parameter of the unknown bandwidth of the spectrum being measured according to the formula:

Reported Parameter("RP")=$A$*(Measured Parameter ("MP"))+$C$, wherein the RP and MP are a different type of parameter and the values of A and C are determined based upon. calibration of the optical bandwidth measuring unit MP response for light of known valued of RP.

14. The apparatus of claim 13 further comprising:
    the optical bandwidth measuring unit comprises an interferometric or dispersive optical instrument.
15. The apparatus of claim 13 further comprising:
    the optical bandwidth measuring unit comprises an etalon.
16. The apparatus of claim 14 further comprising:
    the optical bandwidth measuring unit comprises an etalon.
17. The apparatus of claim 13 further comprising:
    RP is at FWXM and MP is at FWX'M, wherein X≠X'.
18. The apparatus of claim 14 further comprising:
    RP is at FWXM and MP is at FWX'M, wherein X≠X'.
19. The apparatus of claim 15 further comprising:
    RP is at FWXM and MP is at FWX'M, wherein X≠X'.
20. The apparatus of claim 16 further comprising:
    RP is at FWXM and MP is at FWX'M, wherein X≠X'.
21. The apparatus of claim 13 further comprising:
    RP is at EX % and MP is at FWXM.
22. The apparatus of claim 14 further comprising:
    RP is at EX % and MP is at FWXM.
23. The apparatus of claim 15 further comprising:
    RP is at EX % and MP is at FWXM.
24. The apparatus of claim 16 further comprising:
    RP is at EX % and MP is at FWXM.
25. A laser control system, comprising:
    spectrometer means for measuring an unknown bandwidth of a spectrum of light emitted from the laser, comprising:
    an optical bandwidth measuring means for providing as an output a measured parameter, which is indicative of a parameter of the unknown bandwidth of the spectrum being measured;
    a reported parameter computing means for computing a reported parameter of the unknown bandwidth of the spectrum being measured according to the formula:

Reported Parameter("RP")=$A$*(Measured Parameter ("MP"))+$C$, wherein the RP and MP are a different type of parameter and the values of A and C are determined based upon calibration of the optical bandwidth measuring unit MP response for light of known valued of RP.

26. The apparatus of claim 25 further comprising:
    the optical bandwidth measuring means comprises an interferometric or dispersive optical instrument.
27. The apparatus of claim 25 further comprising:
    the optical bandwidth measuring means comprises an etalon.
28. The apparatus of claim 26 further comprising:
    the optical bandwidth measuring means comprises an etalon.
29. The apparatus of claim 25 further comprising:
    RP is at FWXM and MP is at FWX'M, wherein X≠X'.
30. The apparatus of claim 26 further comprising:
    RP is at FWXM and MP is at FWX'M, wherein X≠X'.
31. The apparatus of claim 27 further comprising:
    RP is at FWXM and MP is at FWX'M, wherein X≠X'.
32. The apparatus of claim 28 further comprising:
    RP is at FWXM and MP is at FWX'M, wherein X≠X'.
33. The apparatus of claim 25 further comprising:
    RP is at EX % and MP is at FWXM.
34. The apparatus of claim 26 further comprising:
    RP is at EX % and MP is at FWXM.

35. The apparatus of claim 27 further comprising:
RP is at EX % and MP is at FWXM.

36. The apparatus of claim 28 further comprising:
RP is at EX % and MP is at FWXM.

37. A spectrometer for measuring an-unknown bandwidth of a spectrum of light, comprising:
an optical bandwidth measuring means for providing as an output a measured parameter, which is indicative of a parameter of the unknown bandwidth of the spectrum being measured;
a reported parameter computing means for compute a reported parameter of the unknown bandwidth of the spectrum being measured according to the formula:

Reported Parameter("RP")=$A$*(Measured Parameter ("MP"))+$C$, wherein the RP and MP are different types or parametes and the values of A and C are determined based upon calibration of the optical bandwidth measuring unit MP response for light of known valued of RP.

38. The apparatus of claim 37 further comprising:
the optical bandwidth measuring means comprises an interferometric or dispersive optical instrument.

39. The apparatus of claim 37 further comprising:
the optical bandwidth measuring means comprises an etalon.

40. The apparatus of claim 38 further comprising:
the optical bandwidth measuring means comprises an etalon.

41. The apparatus of claim 37 further comprising:
RP is at FWXM and MP is at FWX'M, wherein X≠X'.

42. The apparatus of claim 38 further comprising:
RP is at FWXM and MP is at FWX'M, wherein X≠X'.

43. The apparatus of claim 39 further comprising:
RP is at FWXM and MP is at FWX'M, wherein X≠X'.

44. The apparatus of claim 40 further comprising:
RP is at FWXM and MP is at FWX'M, wherein X≠X'.

45. The apparatus of claim 37 further comprising:
RP is at EX % and MP is at FWXM.

46. The apparatus of claim 38 further comprising:
RP is at EX % and MP is at FWXM.

47. The apparatus of claim 39 further comprising:
RP is at EX % and MP is at FWXM.

48. The apparatus of claim 40 further comprising:
RP is at EX % and MP is at FWXM.

49. A method for controlling a laser, comprising:
utilizing a spectrometer means for measuring an unknown bandwidth of a spectrum of light emitted from the laser, by:
providing a measurement of a measured parameter, which is indicative of a parameter of the unknown bandwidth of the spectrum being measured;
computing a reported parameter of the unknown bandwidth of the spectrum being measured according to the formula:

Reported Parameter("RP")=$A$*(Measured Parameter ("MP")+$C$, wherein the RP and MP are a different type of parameter and the values of A and C are determined based upon calibration of the optical bandwidth measuring unit MP response for light of known valued of RP;
providing an output representative of the RP to a laser system controller;
utilizing the signal to control an aspect of laser operation.

50. The method of claim 49 further comprising:
utilizing an interferometric or dispersive optical instrument for measuring the optical bandwidth.

51. The method of claim 49 further comprising:
utilizing an etalon for measuring the optical bandwidth.

52. The apparatus of claim 50 further comprising:
utilizing an etalon for measuring the optical bandwidth.

53. The method of claim 49 further comprising:
RP is at FWXM and MP is at FWX'M, wherein X≠X'.

54. The method of claim 50 further comprising:
RP is at FWXM and MP is at FWX'M, wherein X≠X'.

55. The method of claim 51 further comprising:
RP is at FWXM and MP is at FWX'M, wherein X≠X'.

56. The method of claim 52 further comprising:
RP is at FWXM and MP is at FWX'M, wherein X≠X'.

57. The method of claim 49 further comprising:
RP is at EX % and MP is at FWXM.

58. The method of claim 50 further comprising:
RP is at EX % and MP is at FWXM.

59. The method of claim 51 further comprising:
RP is at EX % and MP is at FWXM.

60. The method of claim 52 further comprising:
RP is at EX % and MP is at FWXM.

61. A method for measuring an unknown bandwidth of a spectrum of light, comprising:
utilizing an optical bandwidth measuring means to provide as an output a measured parameter, which is indicative of a parameter of the unknown bandwidth of the spectrum being measured;
computing a reported parameter of the unknown bandwidth of the spectrum being measured according to the formula:

Reported Parameter("RP")=$A$*(Measured Parameter ("MP"))+$C$, wherein the RP and MP are different types or parametes and the values of A and C are determined based upon calibration of the optical bandwidth measuring unit MP response for light of known valued of RP;
providing an output representative of the RP to a laser system controller;
utilizing the signal to control an aspect of laser operation.

62. The method of claim 61 further comprising:
utilizing an interferometric or dispersive optical instrument to provide the optical bandwidth measurement.

63. The method of claim 61 further comprising:
utilizing an etalon to provide the optical bandwidth measurement.

64. The method of claim 62 further comprising:
utilizing an etalon to provide the optical bandwidth measurement.

65. The method of claim 61 further comprising:
RP is at FWXM and MP is at FWX'M, wherein X≠X'.

66. The apparatus of claim 62 further comprising:
RP is at FWXM and MP is at FWX'M, wherein X≠X'.

67. The apparatus of claim 63 further comprising:
RP is at FWXM and MP is at FWX'M, wherein X≠X'.

68. The apparatus of claim 64 further comprising:
RP is at FWXM and MP is at FWX'M, wherein X≠X'.

69. The apparatus of claim 61 further comprising:
RP is at EX % and MP is at FWXM.

70. The apparatus of claim 62 further comprising:
RP is at EX % and MP is at FWXM.

71. The apparatus of claim 63 further comprising:
RP is at EX % and MP is at FWXM.

72. The apparatus of claim 64 further comprising:
RP is at EX % and MP is at FWXM.

* * * * *